United States Patent [19]

Mine et al.

[11] Patent Number: 4,839,514
[45] Date of Patent: Jun. 13, 1989

[54] OPTICAL READER WITH SHADING CORRECTING MEANS

[75] Inventors: Kazunori Mine; Keisuke Murakami; Mamoru Tago; Hiromasa Urata, all of Shizuoka, Japan

[73] Assignee: Tokyo Electric Co., Ltd., Tokyo, Japan

[21] Appl. No.: 132,333

[22] Filed: Dec. 14, 1987

[30] Foreign Application Priority Data

Dec. 15, 1986 [JP] Japan .................. 61-192612[U]

[51] Int. Cl.⁴ .................. H01J 3/14; H01J 5/16; H01J 40/14
[52] U.S. Cl. .................. 250/237 R; 250/578
[58] Field of Search .................. 250/578, 237 R; 358/225, 229, 285, 294, 293

[56] References Cited

U.S. PATENT DOCUMENTS

| | | | |
|---|---|---|---|
| 4,205,349 | 5/1980 | Kawazu et al. | 358/294 |
| 4,644,159 | 2/1987 | Miura | 250/578 |
| 4,677,494 | 6/1987 | Sue | 358/285 |
| 4,682,042 | 7/1987 | Igarashi | 250/578 |

*Primary Examiner*—David C. Nelms
*Assistant Examiner*—Eric F. Chatmon
*Attorney, Agent, or Firm*—Oblon, Fisher, Spivak, McClelland & Maier

[57] ABSTRACT

A reading surface of a document is illuminated by a light source, and a light beam reflected on the reading surface is reflected on a reflecting mirror. Then, the reflected light beam is guided in such a direction as to pass in the vicinity of a light shielding plate for shielding the constitutional elements from the light. A lens is located near the light source at a position where the light beam guided in the above direction is allowed to pass. A shading correcting device is made up of a first shading correcting portion formed by a part of the light shielding plate and a second shading correcting portion formed in a body case for holding the constitutional elements. The shading correcting device is designed to restrict a more quantity of light of the light beam incident upon the lens at a portion nearer to an optical axis of the lens. A photoelectric correcting device is provided in a position where the light beam passing through the lens is focused. As a result, photoelectric converting elements in the photoelectric converting device receive an equalized quantity of light of the light beam. A part of the shading correcting device for equalizing the quantity of light of the light beam incident upon the photoelectric converting means is formed by utilizing the light shielding plate. Accordingly, the number of parts may be reduced, and the assembling work may be simplified.

9 Claims, 3 Drawing Sheets

OPTICAL READER WITH SHADING CORRECTING MEANS

FIELD OF THE INVENTION AND RELATED ART STATEMENT

The present invention relates to an optical reader for reading an image of a document by irradiating light onto the document and converting the light reflected on the document to an electrical signal, and more particularly to an optical reader having a shading correcting means.

FIG. 1 shows a principle of such a device as above. That is, a light beam L having an image on an image recorded surface 50 is focused on plural photoelectric converting elements (not shown) in a photoelectric converting means 52 such as a CCD image sensor by a lens 51. In such an optical reading device employing the above principle, a quantity of light of the light beam L is rendered less as it is left more from an optical axis of the lens 51. While the light beam L passing through the lens 51 is diffracted by the lens 51, the quantity of the diffracted light of the light beam L is increased more at a portion spaced more from the optical axis of the lens 51. As the image on the image recorded surface 50 is focused onto the plural photoelectric converting elements by means of the single lens 51, the quantity of light incident upon the photoelectric converting elements of the photoelectric converting means 52 is rendered less at a portion spaced more from a central position through which the optical axis of the lens 51 passes. As a result, an output from the photoelectric converting elements is reduced. Such a phenomenon is shown by a graph in FIG. 2. That is, the greater a distance S from the center of the photoelectric converting means 52 toward both ends thereof, the less the output from the photoelectric converting elements in the photoelectric converting means 52.

To cope with this problem that the quantity of light incident on each photoelectric converting element is ununiform, the light beam incident on the lens 51 is restricted more at a portion nearer to the optical axis of the lens in the prior art technique. Such a technique is called a shading correction. Some examples of means for exhibiting the shading correction will be described below.

One example shown in FIG. 3 includes a shading correcting member 54 having a slit 53. The slit 53 has a width gradually increasing from the center thereof to both sides. The shading correcting member 54 is positioned on the incident side of a lens 51. Needless to say, the shading correcting member 54 is located in a position such that an optical axis of the lens 51 passes the center of the slit 53.

FIG. 4 shows another example of the shading correcting means. A shading correcting plate 56 formed with a slit 55 is fixed to one end of a lens 51 on the incident side thereof. The slit 55 has a width gradually decreasing from both sides to the optical axis of the lens 51.

In the structures shown in FIGS. 3 and 4, the light beam L incident upon the lens 51 is restricted by the shading correcting member 54 and the shading correcting plate 56 in such a manner that a quantity of light is reduced more at a portion nearer to the optical axis of the lens 51. Thus, the unbalance in the quantity of light incident on each photoelectric converting element in the photoelectric correcting means 52 is corrected.

However, the above-mentioned prior art technique has the following problems. Both the structures shown in FIGS. 3 and 4 cause an increase in the number of parts and therefore render the assembling work troublesome. Particularly, the structure shown in FIG. 4 cannot be applied to a structure where the lens 51 is rotated circumferentially for the purpose of focusing servo because the shading correcting plate 56 is rotated together with the lens 51 to cause a fluctuation in output from the photoelectric converting means 52.

OBJECT AND SUMMARY OF THE INVENTION

It is a first object of the present invention to provide an optional reader which can reduce the number of parts.

It is a second object of the present invention to provide an optical reader which is easily assembled.

It is a third object of the present invention to provide a photoelectric correcting device which can be made compact as a whole.

It is a fourth object of the present invention to provide an optical reader which can make uniform the quantity of light incident upon the photoelectric converting means even when the lens is rotated circumferentially for the purpose of focusing servo.

According to the present invention, a reading surface of a document is illuminated by a light source, and a light beam reflected on the reading surface is reflected on a reflecting mirror. Then, the reflected light beam is guided in such a direction as to pass in the vicinity of a light shielding plate for shielding the constitutional elements from the light. A lens is located near the light source at a position where the light beam guided in the above direction is allowed to pass. A shading correcting means comprises a first shading correcting portion formed by a part of the light shielding plate and a second shading correcting portion formed in a body case for holding the constitutional elements. The shading correcting means is designed to restrict a more quantity of light of the light beam incident upon the lens at a portion nearer to an optical axis of the lens. A photoelectric correcting means is provided in a position where the light beam passing through the lens is focused. As a result, photoelectric converting elements in the photoelectric converting means receive an equalized quantity of light of the light beam. In the structure as mentioned above, a part of the shading correcting means for equalizing the quantity of light of the light beam incident upon the photoelectric converting means is formed by utilizing the light shielding plate. Accordingly, the number of parts may be reduced, and the assembling work may be simplified. Furthermore, since the light source is located near the lens, the device may be made compact as a whole. Additionally, since the shading correcting means is not fixed to the lens, the lens may be designed to rotate circumferentially for the purpose of focusing servo.

DESCRIPTION OF PREFERRED EMBODIMENT

Figure 1:
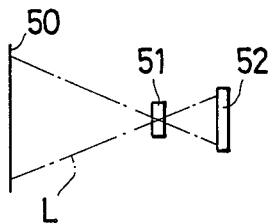
FIG. 1 is a side view illustrating the principle of reading operation of the conventional optical reader.
Figure 2:
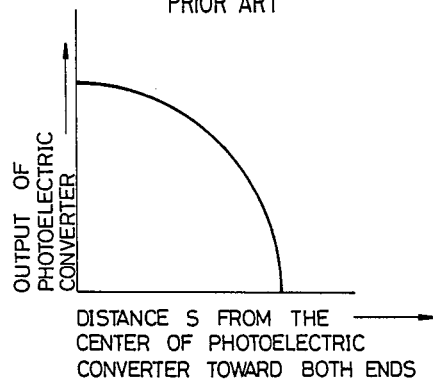
FIG. 2 is a graph showing the relation between the located position of the photoelectric converting elements in the photoelectric converting means and the output from the photoelectric converting elements.
Figure 3:
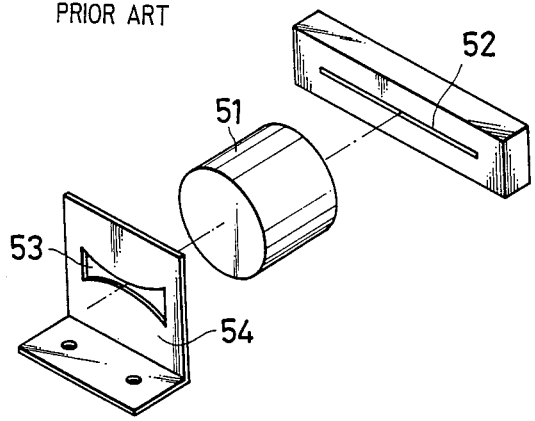
FIG. 3 is a perspective view of an exemplary device provided with the shading correcting means.
Figure 4:
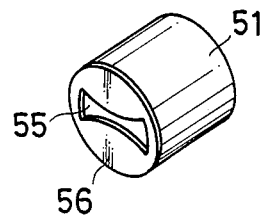
FIG. 4 is a perspective view of another example of the shading correcting means.
Figure 5:
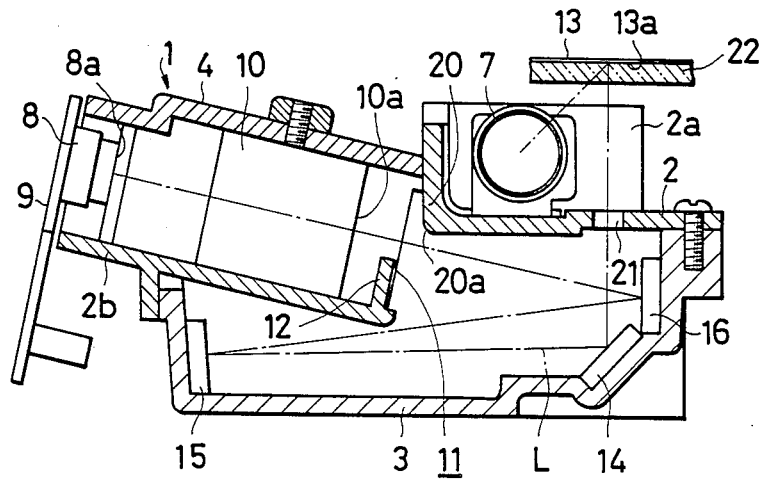
FIG. 5 is a vertical sectional view of a preferred embodiment of the present invention.
Figure 6:
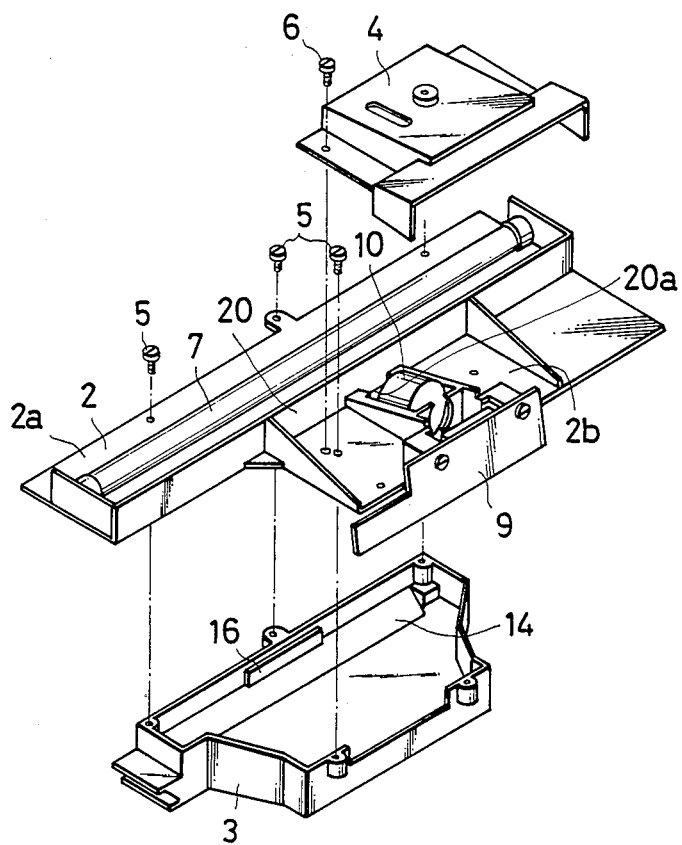
FIG. 6 is an exploded perspective view of the preferred embodiment.
Figure 7:
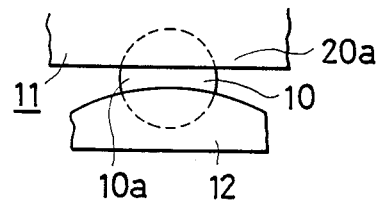
FIG. 7 is a view of the lens and the shading correcting means as seen from the incident side.

There will now be described a preferred embodiment of the present invention with reference to FIGS. 5 to 7. Reference numeral 1 generally designates a body case for holding each constitutional element at fixed positions. The body case 1 is constituted of an upper case 2 and a lower case 3 connected to each other by means of screws 5. A cover 4 is connected to the upper case 2 by means of a screw 6.

The upper case 2 will now be described in detail. Basically, the upper case 2 is formed by integrally fixing a light source holding portion 2a with a sensor holding portion 2b. The light source holding portion 2a and the sensor holding portion 2b are completely shielded from each other by means of a light shielding plate 20 forming a part of the light source holding portion 2a. A single fluorescent lamp 7 of a straight tube type as a light source is held by the light source holding portion 2a. The light source holding portion 2a is formed with a light passing hole 21 having a predetermined length in the longitudinal direction of the fluorescent lamp 7. On the other hand, a CCD image sensor 8 as a photoelectric converting means is held through a base 9 on the sensor holding portion 2b. A columnar lens 10 is held in a position opposed to a light receiving surface of the CCD image sensor 8 in such a manner as to be slidable in a direction of the optical axis. The upper case 2 is provided with a shading correcting means 11. The shading correcting means 11 is constituted of a first shading correcting portion 20a formed by a part of the light shielding plate 20 forming a part of the upper case in opposed relationship to an incident surface 10a of the lens 10, and a second shading correcting portion 12 integrally formed with the sensor holding portion 2b. As shown in FIG. 7, the first shading correcting portion 20a has a straight lower edge positioned slightly above the optical axis of the lens 10. On the other hand, the second shading correcting portion 12 has an arcuate upper edge such that it is upwardly curved at its central portion, and it is positioned slight below the optical axis of the lens 10.

Next, the lower case 3 will now be described in detail. The lower case 3 is provided with a first reflecting mirror 14, a second reflecting mirror 15 and a third reflecting mirror 16. The first reflecting mirror 14 is located just below the light passing hole 21 formed through the upper case 2, and is inclined at an angle of about 45 degrees. The second reflecting mirror 15 is located at an angle and in a position such that the light beam L vertically passing through the light passing hole 21 and reflected at substantially right angles on the first reflecting mirror 14 is received by the second reflecting mirror 15, and the light beam L reflected on the second reflecting mirror 15 is returned to a position in the vicinity of the first reflecting mirror 14. The third reflecting mirror 16 is located at an angle and in a position such that the light beam L reflected on the second reflecting mirror 15 is received by the third reflecting mirror 16, and the light beam L reflected on the third reflecting mirror 16 advances toward the incident surface 10a of the lens 10.

A transparent document table 22 for mounting a document 13 thereon is provided over the light source holding portion 2a in the upper case 2. The document 13 is mounted on the document table 22 in such a manner that an image recorded surface 13a of the document 13 is opposed to the upper surface of the document table 22.

In operation, the image recorded surface 13a of the document 13 is illuminated by the fluorescent lamp 7, so as to read the image recorded surface 13a. Then, the light beam L reflected on the image recorded surface 13a is allowed to pass through the light passing hole 21, and is sequentially reflected on the first reflecting mirror 14, the second reflecting mirror 15 and the third reflecting mirror 16. The light beam L finally reflected on the third reflecting mirror 16 is focused through the lens 10 to the CCD image sensor 8. At this time, the light beam L reflected on the third reflecting mirror 16 and entering the incident surface 10a of the lens 10 is most restricted at a portion of the optical axis of the lens 10 by the shading correcting means 11. The quantity of light to be restricted is gradually reduced in a direction left away from the optical axis of the lens 10. Accordingly, the quantity of light of the light beam L incident through the lens 10 onto the CCD image sensor 8 is equalized between at the central portion of the CCD image sensor 8 and at both end portions thereof. As a result, an equal quantity of light is received by each of plural photoelectric converting elements (not shown) in the CCD image sensor 8, and an equal output is generated from each photoelectric element.

In this embodiment, since the first shading correcting portion 20a as a member of the shading correcting means 11 is formed by utilizing a part of the light shielding plate 20, the number of parts may be reduced, and the assembling work may be therefore simplified. Such simplification of the assembling work is also owing to the fact that the second shading correcting portion 12 is integrally formed with the upper case 2. Further, since the first shading correcting portion 20a is formed by utilizing a part of the light shielding plate 20, the light source 7 may be located in the vicinity of the lens 10, thereby making the device compact as a whole.

Moreover, since the light beam L reflected on the image recorded surface 13a is sequentially reflected on the first reflecting mirror 14, the second reflecting mirror 15 and the third reflecting mirror 16, and is then allowed to enter the incident surface 10a of the lens 10, a fixed length of light path may be obtained in a small case, thereby contributing to the compact structure of the device as a whole.

In a modified embodiment, the lens 10 may be designed to rotate circumferentially for the purpose of focusing servo. Such a design of circumferentially rotating the lens 10 does not influence on the shading correction effect of the present invention because the shading correcting means 11 is fixedly formed on the body case 1. In a further modification, it may be designed to form the second shading correcting portion 12 independently of the upper case 2 and fix the former to the latter. In a still further modification, the lower edge of the first shading correcting portion 20a may be of any suitable shapes such as an arcuate shape instead of the straight line shown in FIG. 7. In this case, it is sufficient to make the quantity of light of the light beam L incident upon the light receiving surface 8a of the CCD image sensor 8 be equalized over the light receiving surface 8a by the complementary shape defined by the first shading correcting portion 20a and the second shading correcting portion 12.

What is claimed is:

1. A photoelectric converting device comprising:
   a body case formed from an upper and lower element;
   a light source held in said body case for irradiating a light beam onto a reading surface of a document;
   a light shielding plate held in said body case and which is part of said upper element, for shielding the light beam generated from said light source;
   a reflecting mirror held in said body case and which is part of said lower element for reflecting the light beam reflected on a reading surface in a direction such that light will pass a part of said light shielding plate;
   a photoelectric converting means held in said body case for receiving the light beam reflected on said reflecting mirror;
   a lens located in said body case such that the light beam reflected on said reflecting mirror is focused on said photoelectric converting means; and
   a shading correcting means held in said body case comprising a first shading correcting portion having such a shape as to restrict the light beam incident on said lens and formed by a part of said light shielding plate, and a second shading correcting portion for restricting the light beam incident on said lens more in a quantity of light at a portion nearer to an optical axis of said lens by a complementary shape defined by said first and second shading correcting portions.

2. The photoelectric converting device as defined in claim 1, wherein said shading correcting means is located at a position adjacent to said lens.

3. The photoelectric converting device as defined in claim 1, wherein said first shading correcting portion is of a straight shape.

4. The photoelectric converting device as defined in claim 1, wherein said second shading correcting portion is integrally formed with said body case.

5. The photoelectric converting device as defined in claim 1, wherein said reflecting mirror comprises a first reflecting mirror for reflecting directly at substantially right angles the light beam reflected on said reading surface of said document, a second reflecting mirror for reflecting the light beam reflected on said first reflecting mirror and returning the light beam to a position in the vicinity of said first reflecting mirror, and a third reflecting mirror for reflecting the light beam reflected on said second reflecting mirror toward said photoelectric converting means.

6. The photoelectric converting device as defined in claim 1, wherein said light source comprises a fluorescent lamp.

7. The photoelectric converting device as defined in claim 6, wherein said fluorescent lamp is a single one.

8. The photoelectric converting device as defined in claim 1, wherein said photoelectric converting means comprises a CCD image sensor.

9. The photoelectric converting device as defined in claim 1, wherein said body case comprises a lower case for holding said reflecting mirror and an upper case for holding said light source, said photoelectric converting means and said lens.

* * * * *